United States Patent [19]

Smith

[11] Patent Number: 4,720,321

[45] Date of Patent: Jan. 19, 1988

[54] METHOD AND APPARATUS FOR MANUFACTURING PACKAGING PADS

[75] Inventor: Gary T. Smith, Lemon Cove, Calif.

[73] Assignee: Keyes Fibre Company, Waterville, Me.

[21] Appl. No.: 748,961

[22] Filed: Jun. 26, 1985

[51] Int. Cl.[4] .................................................. B29J 5/00

[52] U.S. Cl. ...................................... 156/549; 19/148; 156/199; 156/276; 156/279; 156/324; 156/553; 222/343

[58] Field of Search ............... 156/276, 279, 324, 200, 156/201, 461, 551, 292, 500, 550, 553, 549, 552, 199; 242/57.1; 222/343; 198/613, 723; 19/148, 302, 301; 425/80.1, 81.1

[56] References Cited

U.S. PATENT DOCUMENTS

| | | | |
|---|---|---|---|
| 2,004,658 | 6/1935 | Gerard | 156/276 X |
| 2,028,388 | 1/1956 | Gerard et al. | 156/276 X |
| 2,151,886 | 3/1939 | Barrett | 222/343 X |
| 2,380,527 | 7/1945 | Hoggatt . | |
| 2,406,801 | 9/1946 | Byers . | |
| 2,429,296 | 10/1947 | Richman | 222/343 X |
| 2,868,351 | 1/1959 | Hegmann | 198/723 X |
| 2,985,219 | 5/1961 | Summerfield . | |
| 3,071,823 | 1/1963 | Platt et al. | 19/148 X |
| 3,095,315 | 6/1963 | Magill, Jr. et al. . | |
| 3,544,419 | 12/1970 | Gerard . | |
| 3,597,302 | 8/1971 | Gerard . | |
| 3,661,680 | 5/1972 | Gore . | |
| 3,668,055 | 6/1972 | Gerard . | |
| 3,717,905 | 2/1973 | Furbeck | 19/148 |
| 3,759,772 | 9/1973 | Andersson | 156/324 X |
| 3,779,850 | 12/1973 | Gerard . | |
| 3,965,906 | 6/1976 | Karami . | |
| 3,973,291 | 8/1976 | Kolbach | 19/148 |
| 4,077,579 | 3/1978 | Seleski et al. | 242/57.1 |
| 4,085,560 | 4/1978 | McClosky . | |
| 4,204,593 | 5/1980 | Leach . | |
| 4,253,892 | 3/1981 | D'Angelo . | |
| 4,375,446 | 3/1983 | Fujii et al. . | |
| 4,375,447 | 3/1983 | Chung . | |
| 4,375,448 | 3/1983 | Appel et al. . | |
| 4,592,708 | 6/1986 | Fiest et al. | 19/148 X |
| 4,598,441 | 7/1986 | Stemmler | 425/81.1 |

*Primary Examiner*—David Simmons
*Attorney, Agent, or Firm*—Connolly and Hutz

[57] ABSTRACT

Packaging pads comprise top and bottom sheets laminated together along peripheral surface portions with a pocket of comminuted filler material centrally disposed between the sheets. Apparatus for manufacturing the pads continuously feeds an endless bottom sheet along a predetermined travel path, and liquid adhesive is applied to the upper surface of the sheet as it so travels. A stream of filler material is divided into spaced apart individual pocket amounts and these filler amounts are joined to the adhesive coated surface of the bottom sheet. A top sheet coated with liquid adhesive on the underside thereof is laminated onto the bottom sheet and the pocket amounts of filler material. The thus formed continuous laminate is transversely cut midway between adjacent pockets of filler material to thereby form individual packaging pads.

10 Claims, 15 Drawing Figures

22
20

120
128
132
130
126
124
134
14
122
162
160
164
172
148
146
148
152
166
24
140
150
142
144
146
168
26
170
14
180
180
80

METHOD AND APPARATUS FOR MANUFACTURING PACKAGING PADS

BACKGROUND OF THE INVENTION

The present invention relates to method and apparatus for producing packaging pads, and more particularly to the production of packaging pads for cushioning fruit such as apples and the like as well as other delicate items.

Packaging materials of one type or another are often used to cushion and thereby protect delicate container contents during transit. From an economic standpoint, such packaging materials must be relatively inexpensive to produce since they are not reused and instead often discarded by the receiver of the goods. In the packaging of fruit such as apples and the like, it is customary to separate adjacent layers of fruit with some form of cushioning material. Cushioning may be provided by molded pulp inserts configured to accommodate the fruit and dimensioned to fit within the shipping carton. Alternatively, flexible padding may be used between the fruit layers, the padding usually comprising opposite paper sheets with cushioning material disposed between the sheets, such as milled newsprint, for example. Each of the various layers of fruit is separated from an adjacent layer by a packaging pad. The present invention is primarily directed to both method and apparatus for producing such packaging pads.

SUMMARY OF THE INVENTION

Accordingly, it is an object of the present invention to provide an automatic and reliable apparatus for manufacturing packaging pads at high production rates and minimum costs.

Another object of the present invention is the provision of an efficient method for manufacturing packaging pads, such method being characterized by its overall simplicity and reliability as well as its efficient nature and high production rate.

Packaging pads produced by the method and apparatus of the present invention have a bottom and top sheet laminated together along peripheral surface portions with a pocket of comminuted filler material disposed between central portions of the sheets.

In accordance with the present invention, apparatus includes bottom sheet feeding structure arranged to continuously feed an endless bottom sheet along a predetermined travel path while gluing structure applies liquid adhesive to the entire upper surface of the bottom sheet. Filler depositing structure continuously receives and separates a stream of filler material into spaced apart individual pocket amounts and these amounts are serially applied to the adhesive coated surface of the bottom sheet. As a result thereof, each individual pocket amount of filler material is surrounded by adhesive coated transverse and side peripheral surface portions of the bottom sheet. Top sheet feeding structure is arranged to continuously feed an endless top sheet and liquid adhesive is applied to the entire lower surface of the top sheet. Laminating structure joins the transverse and side peripheral surface portions of the bottom sheet with the top sheet to thereby form a continuous laminate with spaced apart pocket amounts of filler material therebetween. Ultimately, severing structure transversely cuts the continuous laminate midway between adjacent pockets of filler material to thereby form individual packaging pads.

Preferably the bottom sheet feeding structure comprises spaced apart upstanding frames with at least one supply roll of sheet material journaled between the frames for rotation about a substantially horizontal axis. As the sheet material is pulled from the supply roll, braking pressure is applied to the roll to thereby control rotation thereof whereby the bottom sheet is fed at a predetermined and substantially constant rate. Moreover the upstanding support frames of the bottom sheet feeding structure may be mounted for transverse shifting movement for controlling the travel path of the bottom sheet as it is pulled from the supply roll.

An edge sensor downstream from the first gluing structure is arranged to sense the location of one side edge of the endless bottom sheet, and control signals representative of that edge location are generated. In response to such control signals from the edge sensor, the bottom sheet feeding means is transversely adjusted whereby travel of the endless bottom sheet is maintained along its predetermined travel path.

Preferably, the stream of filler material flows through an adjustable discharge for controlling the rate amount thereof. Primarily the filler depositing structure which receives and separates the stream of filler material into spaced apart individual pocket amounts comprises a drum having a cylindrical outer surface and rotatably mounted about a transverse axis. Equally spaced apart radially shifting spacer bars at the outer surface of the drum transversely extend across the drum surface for dividing the filler material into the individual pocket amounts. Pressing structure guides and urges the adhesive coated surface of the bottom sheet into engagement with the pockets of the filler material located between the spacer bars. Such pressing structure may comprise a continuous compression belt trained about a plurality of belt rollers. Bar operators are connected to retract the spacer bars to below the drum surface as the adhesive coated surface of the bottom sheet is urged into engagement with the individual pockets of filler material on the drum surface. This procedure produces spaced apart individual pocket amounts of filler material adhering to the endless bottom sheet, each pocket amount being surrounded by adhesive coated transverse and side peripheral surface portions.

The spacer bar operators include a stationary cam plate at each side of the rotatable drum with a continuous cam track in each plate. Cam followers on the spacer bars are connected to ride in the cam tracks for radially shifting the spacer bars between extended positions where the outer tip portions thereof are outwardly of the drum surface and retracted positions where the bar tips are below the drum surface.

The top sheet feeding structure also comprises spaced apart upstanding frames with at least one supply roll of sheet material journaled between the frames for rotation about a substantially horizontal axis. Braking pressure is applied to the roll in a manner similar to the bottom feed to thereby control rotation of the roll and insure that the top sheet is fed at a predetermined and substantially constant rate equal to the feed rate of the bottom sheet. A further edge sensor downstream from the second gluing structure is arranged to sense the location of one side edge of the endless top sheet, and control signals representative of that edge location are generated. These control signals trigger appropriate adjustment structure that transversely shifts the top sheet feeding means to thereby maintain travel of the top sheet along its predetermined path.

The adjustment structure for the top sheet feeding structure may include at least one transversely mounted roller element which shifts in response to the control signals to thereby alter and control the path of the top sheet as it travels to the laminating structure.

In the preferred embodiment, the laminating structure comprises a pair of mating rotatable rollers that collectively form a roller nip. The top sheet and the bottom sheet with spaced apart pocket amounts of filler material thereon are guidingly directed into and through the roller nip. One of the mating rollers has a cylindrical outer surface while the other roller includes surface cavities dimensioned to accommodate the spaced apart pocket amounts of filler material laminated between the top and bottom sheets. Generally the configured roller includes two equally spaced apart cavities separated from each other by transverse pressing bars. These bars function to laminate the top sheet to the transverse surface portions of the bottom sheet inbetween each pocket amount of filler material. Additionally, the configured roller has narrow cylindrical pressing sections, one on each side thereof, and these sections function to laminate the top sheet to the side peripheral surface portions of the bottom sheet.

The severing structure may also include a pair of mating rotatable rollers forming a roller nip into and through which the continuous laminate is directed. At least one transverse knife blade on one of these rollers is arranged to transversely cut the continuous laminate midway between adjacent pockets of filler material as the laminate passes through the roller nip. Such severing action separates the laminate into individual packaging pads. Moreover, the severing structure may further include a pair of spaced apart side edge trimmers for trimming the edges of the continuous laminate just prior to forming the individual pads.

The present invention also includes a method for manufacturing packaging pads comprising the steps of continuously feeding an endless bottom sheet along a predetermined travel path, and applying liquid adhesive to the entire upper surface of the bottom sheet. A continuous stream of filler material is metered at a predetermined rate after which such stream is separated into individual pocket amounts. These amounts are serially applied to spaced apart central surface portions on the adhesive coâted surface of the bottom sheet. Simultaneously with the feeding of the bottom sheet, an endless top sheet is continuously fed and liquid adhesive is applied to the entire lower surface thereof. The top sheet is positioned directly over the bottom sheet and the two sheets are laminated together by joining the adhesive coated transverse and side peripheral surface portions of the bottom sheet to the adhesive coated top sheet. A continuous laminate is thus formed having spaced apart pocket amounts of filler material therebetween. Transversely severing the continuous laminate midway between adjacent pockets of filler material forms the individual packaging pads.

BRIEF DESCRIPTION OF THE DRAWING

Novel features and advantages of the present invention in addition to those noted above will become apparent to those skilled in the art from a reading of the following detailed description in conjunction with the accompanying drawing wherein wimilar reference characters refer to similar parts and in which.

DETAILED DESCRIPTION OF THE INVENTION

Figure 1:
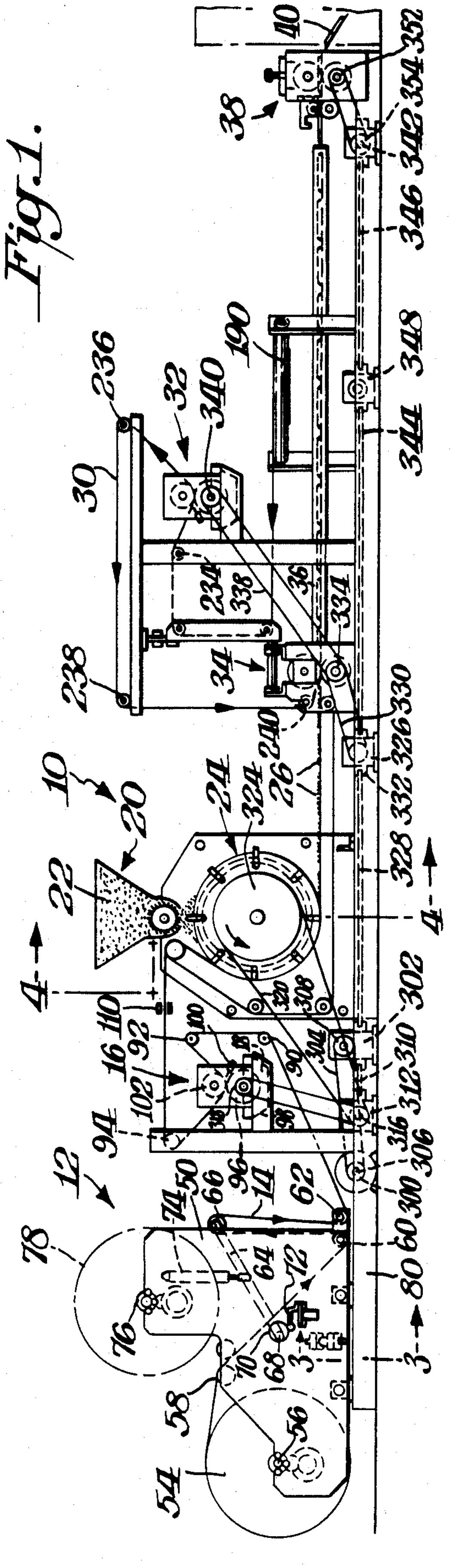
FIG. 1 is a side elevations view illustrating apparatus for continuously manufacturing packaging pads, according to the present invention.
Figure 2:
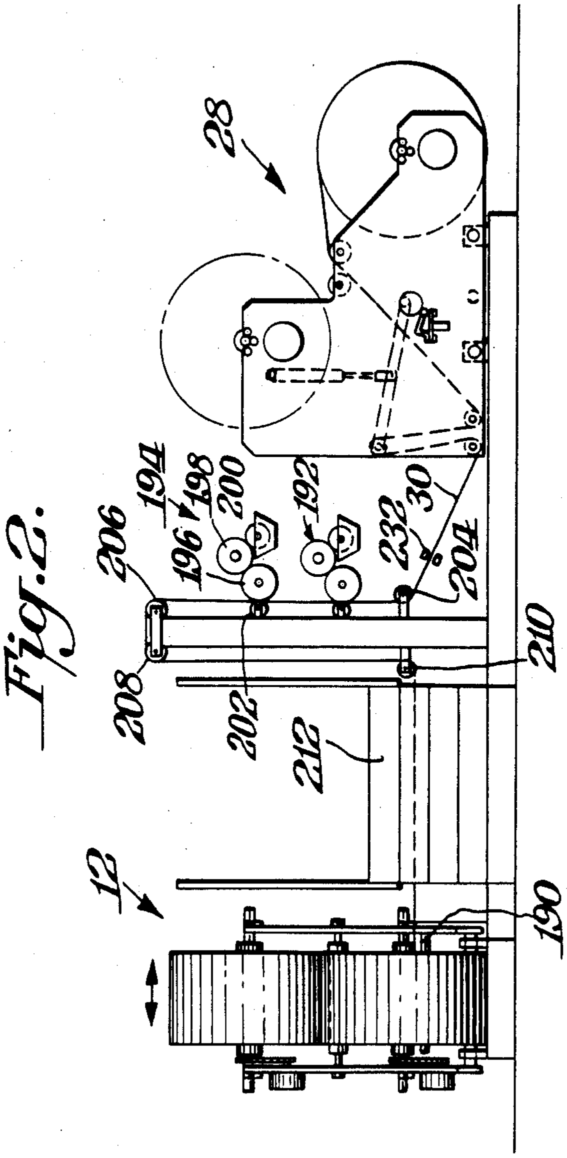
FIG. 2 is a left end elevational view of the pad manufacturing apparatus of FIG. 1.
Figure 4:
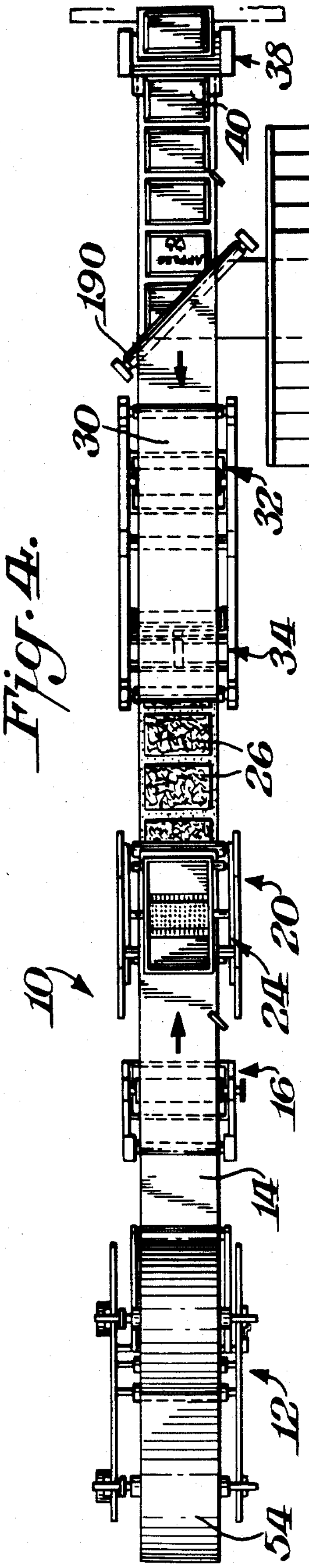
FIG. 4 is a top plan view of the pad manufacturing apparatus shown in FIG. 1.
Figure 4:
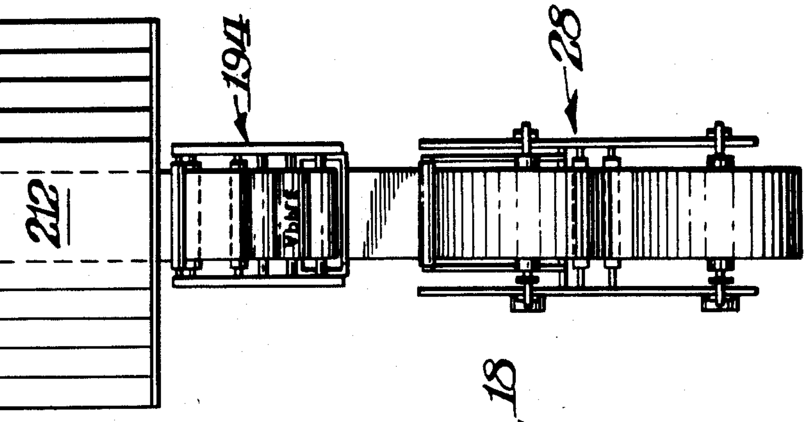

Referring in more particularity to the drawing, FIGS. 1, 2 and 4 illustrate apparatus 10 for producing packaging pads primarily used for cushioning fruit such as apples and the like as well as other delicate items. While the end product produced by apparatus 10 is particularly referred to as an apple packaging pad, such pads have other uses and may be employed whenever cushioning is desired. As explained more fully below, packaging pads produced by apparatus 10 generally include a top and bottom sheet laminated together along peripheral surface portions with a pocket of comminuted filler material disposed between central portions of the sheets.

Apparatus 10 includes bottom sheet feeding structure 12 arranged to continuously feed an endless bottom sheet 14 along a predetermined travel path, and gluing structure 16 applies liquid adhesive 18 to the entire upper surface of the bottom sheet. Filler metering structure 20 is arranged to discharge a continuous stream of filler material 22 at a predetermined rate. Filler depositing structure 24 continuously receives and separates the stream of filler material 22 into individual pocket amounts 26 and serially applies these amounts to spaced apart central surface portions on the adhesive coated surface of bottom sheet 14. Top sheet feeding structure 28 is arranged to continuously feed an endless top sheet 30, and further gluing structure 32 applies liquid adhesive 18 to the entire lower surface of top sheet 30. Laminating structure 34 joins adhesive coated portions of bottom sheet 14 with the adhesive coated top sheet 30 to thereby form a continuous laminate 36 with spaced apart pocket amounts 26 of filler material 22 between the sheets. Severing structure 38 transversely cuts continuous laminate 36 midway between adjacent pockets of filler material to thereby form individual packaging pads 40. One such package pad measures 11½ by 19½ inches with the top and bottom sheets comprising 40# Kraft paper and the filler material weighing about 3.75 oz.

Bottom sheet feeding structure 12 comprises a pair of upstanding support frames 50,52 with a paper supply roll 54 journaled between the frames for rotation about a substantially horizontal axis 56. While other materials are suitable, bottom sheet 14 may be 40# Kraft paper. As explained more fully below, endless bottom sheet 14 is pulled from supply roll 54 by the downstream pulling action exerted on the bottom sheet at the filler depositing structure 24. Basically, the bottom sheet leaves the supply roll and is trained over several fixed guide rollers 58,60 journaled between the upstanding support frames 50,52. Additionally, bottom sheet 12 is trained over a movable guide roller 62 connected at the free end of a dancer assembly 64 which allows roller 62 to move up and down, as best shown in FIG. 1. A further rotatable roller 66 journaled between upstanding support frames 50,52 defines the exit path of bottom sheet 14 as it leaves feeding structure 12 along its travel path to gluing structure 16.

The dancer assembly 64 functions to apply braking pressure to supply roll 54 to control the rotation thereof and insure that the bottom sheet unwinds from the roll at a predetermined and substantially constant rate. In this regard, one end of the dancer assembly is pivoted to the framework at 68 where a cam surface 70 on the assembly interacts with a lever 72 that controls the amount of braking pressure applied to supply roll 54. Biasing device 74 urges the roller end of the dancer assembly in an upward direction.

Operationally, when the endless bottom sheet 14 pulls dancer assembly 64 in a downward direction about its pivotal connection 68, cam surface 70 presses against lever 72 thereby decreasing the braking pressure on supply roll 54. Such decrease of braking pressure allows supply roll 54 to freely rotate whereupon the unwinding rate of the bottom sheet increases and the biasing device 74 urges the dancer assembly 64 in an upward direction. This movement produces a slight increase in the braking pressure on supply roll 54 whereupon slightly more resistance is exerted on the supply roll. Hence, the dancer assembly shifts in upward and downward directions to alter the braking pressure on the supply roll and thereby control its rotation resistance.

The bottom sheet feeding structure also includes a journaled support 76 for holding a reserve supply roll 78. The tail end of supply roll 54 is simply connected to the starter end of reserve roll 78 which causes the dancer assembly to shift in a downward direction during the brief moments these ends are manually fastened together. Hence, the feed of bottom sheet 14 is continuous and without interruption. Braking pressure for journal 76 of reserve roll 78 is accomplished and provided in the same manner as supply roll 54.

Figure 3:
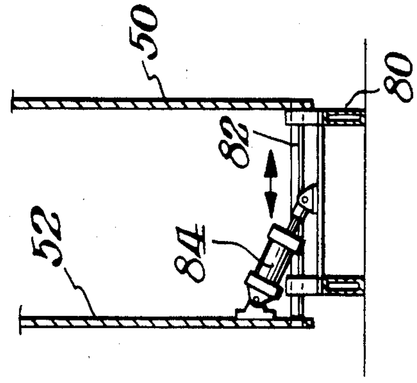
FIG. 3 is an enlarged sectional view taken along line 3—3 of FIG. 1.

As shown best in FIG. 3, bottom sheet feeding structure 12 is mounted for transverse shifting movement relative to main framework 80 for the overall apparatus. Specifically, the base portions of upstanding support frames 50,52 are interconnected by bar supports 82 slidably mounted to framework 80. A pneumatic piston and cylinder device 84 is connected between upstanding support frame 52 and the apparatus framework 80. Activation of device 84 transversely shifts the bottom sheet feeding structure which ultimately alters the travel path of bottom sheet 14 as it is pulled from the supply roll. In other words, as the feeding structure transversely shifts, the exit path of the bottom sheet is similarly shifted in a transverse direction. Control of the pneumatic piston and cylinder device is explained below.

A plurality of fixed rollers 90,92,94 journaled to framework 80 guide endless bottom sheet 14 into and through gluing structure 16 where liquid adhesive 18 is applied to the top surface of the sheet. Basically, the gluing structure includes a lower glue applying roller in the form of the Gravure glue applicator 96 which picks up adhesive from supply 98 and applies that adhesive to the endless bottom sheet. A wiper blade 100 engages the surface of roller 96 to insure that the proper amount of adhesive is applied to the sheet, and an upper rotatable roller 102 urges the paper sheet into engagement with roller 96. As explained more fully below, roller 96 is driven so that the surface speed thereof is substantially equal to the linear travel speed of the bottom sheet.

Figure 14:
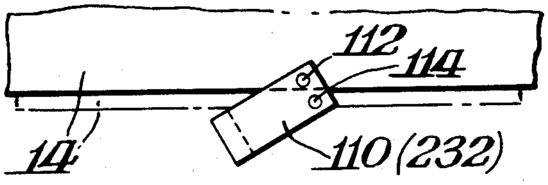
FIG. 14 is a top plan view of the sensor structure shown in FIG. 13.
Figure 13:
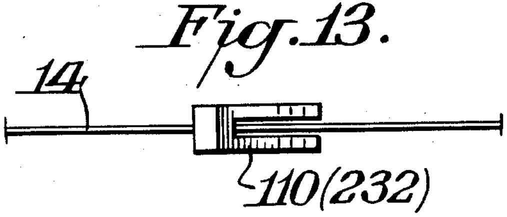
FIG. 13 is a side elevational view of sensor structure for detecting the edge location of a sheet as it travels through the pad manufacturing apparatus.

As shown best in FIGS. 4, 13 and 14, an edge sensor 110 is positioned downstream from gluing structure 16, approximately midway between the gluing structure and the filler metering structure. Basically, sensor 110 is arranged to sense the location of one side edge of the endless bottom sheet 14 and to generate a control signal representative of that edge location. In the illustrated embodiment of the invention, such control signal is delivered to the piston and cylinder device 84 to transversely shift the bottom sheet feeding structure when appropriate and thereby correct any misalignment of the paper feed. Sensor 110 may include two photocells comprising an inside cell 112 and an outside cell 114. Operationally, when the side edge of endless bottom sheet 14 only interrupts the inside photocell, the paper feed is properly aligned and no transverse shifting of the feeding structure occurs. On the other hand, when the travel path of bottom sheet 14 shifts somewhat to the right, as viewed in FIG. 4, both photocells 112,114 are interrupted by the side edge of the bottom sheet. Sensor 110 then forwards a correction signal to piston cylinder device 84 and feeding structure 12 is transversely shifted to the left to thereby properly align the travel path of the bottom sheet along its predetermined course. Conversely, when both photocells 112, 114 are uninterrupted by the side edge of the bottom sheet, a control signal is generated indicating that the bottom sheet has shifted too far left whereupon piston and cylinder device 84 transversely shifts feeding structure 12 to the right until the paper path is properly aligned. Sensor 110 coupled with transverse adjustment of the feeding structure 12 insures that the endless bottom sheet entering filler depositing structure 24 is properly aligned.

Filler metering structure 20 preferably includes a hopper 120 loaded with filler material 22, such as milled newsprint, for example, having an approximate three-eights inch particle size. The hopper includes an adjustable discharge opening 122 formed by a fixed baffle plate 124 on one side thereof and an adjustable baffle plate 126 on the other side hingedly connected to hopper 120 along a horizontal hinge pin 128. The remaining sides defining the hopper discharge opening are fixed, and adjustable baffle 126 merely swings between these fixed hopper sides to adjust discharge opening 122 and the rate amount of filler material flowing from the filler metering structure. Any suitable operator may be connection to swing baffle plate 126. A rotating roller 130 with bristles 132 on the exterior thereof is journaled within the hopper for rotation about a transverse axis defined by shaft 134. Drive 136 is connected to rotate shaft 134 via transmission 138. The rotational speed of roller 130 coupled with the actual size of discharge opening 122 controls the discharge rate of the filler material. Other factors being equal, when the rotational speed of roller 130 is increased, the flow rate of the discharged filler material increases. Conversely, lower rotational speeds of roller 130 decrease the flow rate of the filler material.

Figure 5:
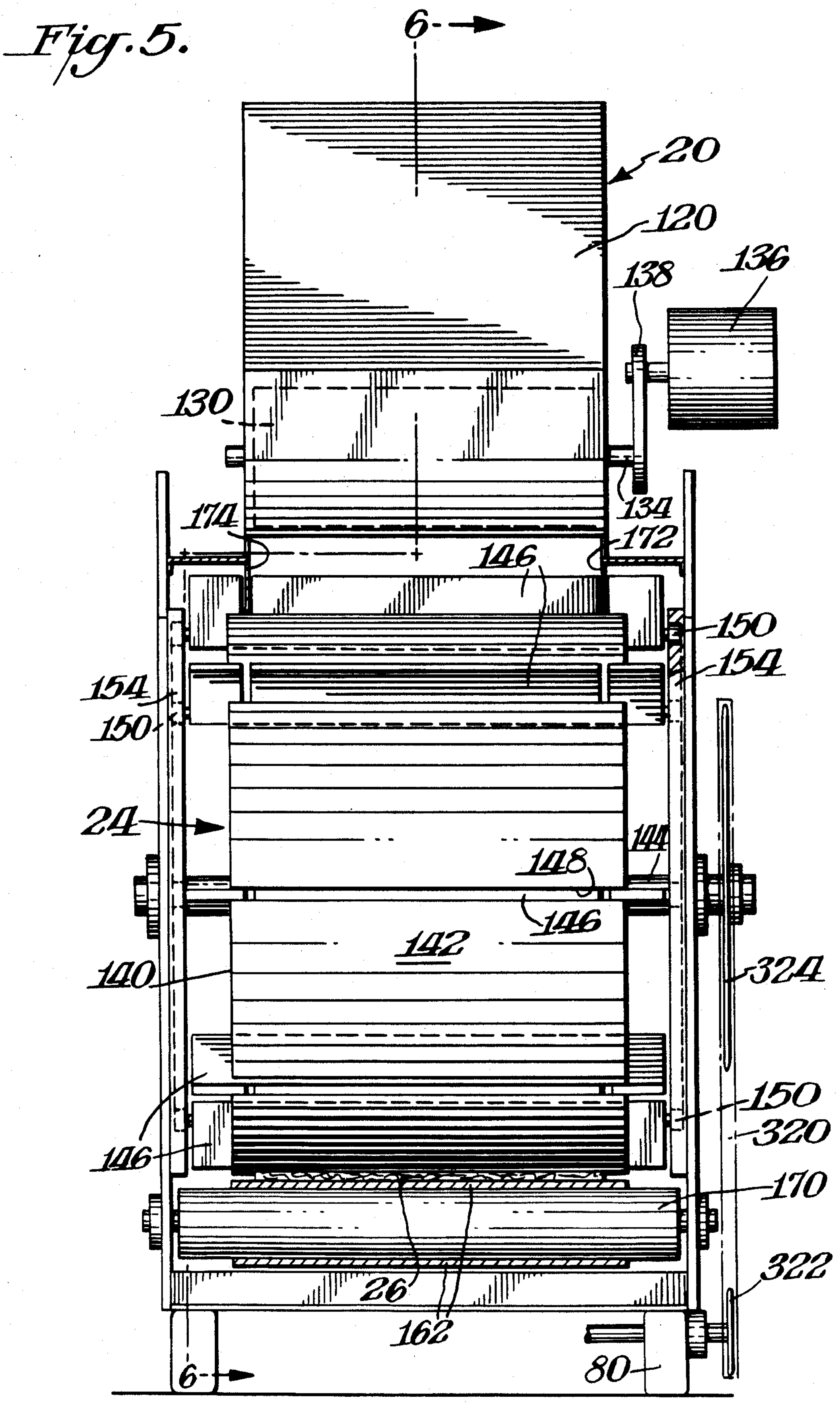
FIG. 5 is a sectional view substantially taken along line 5—5 of FIG. 1 illustrating the filler metering and depositing stations of the pad manufacturing apparatus.
Figure 6:
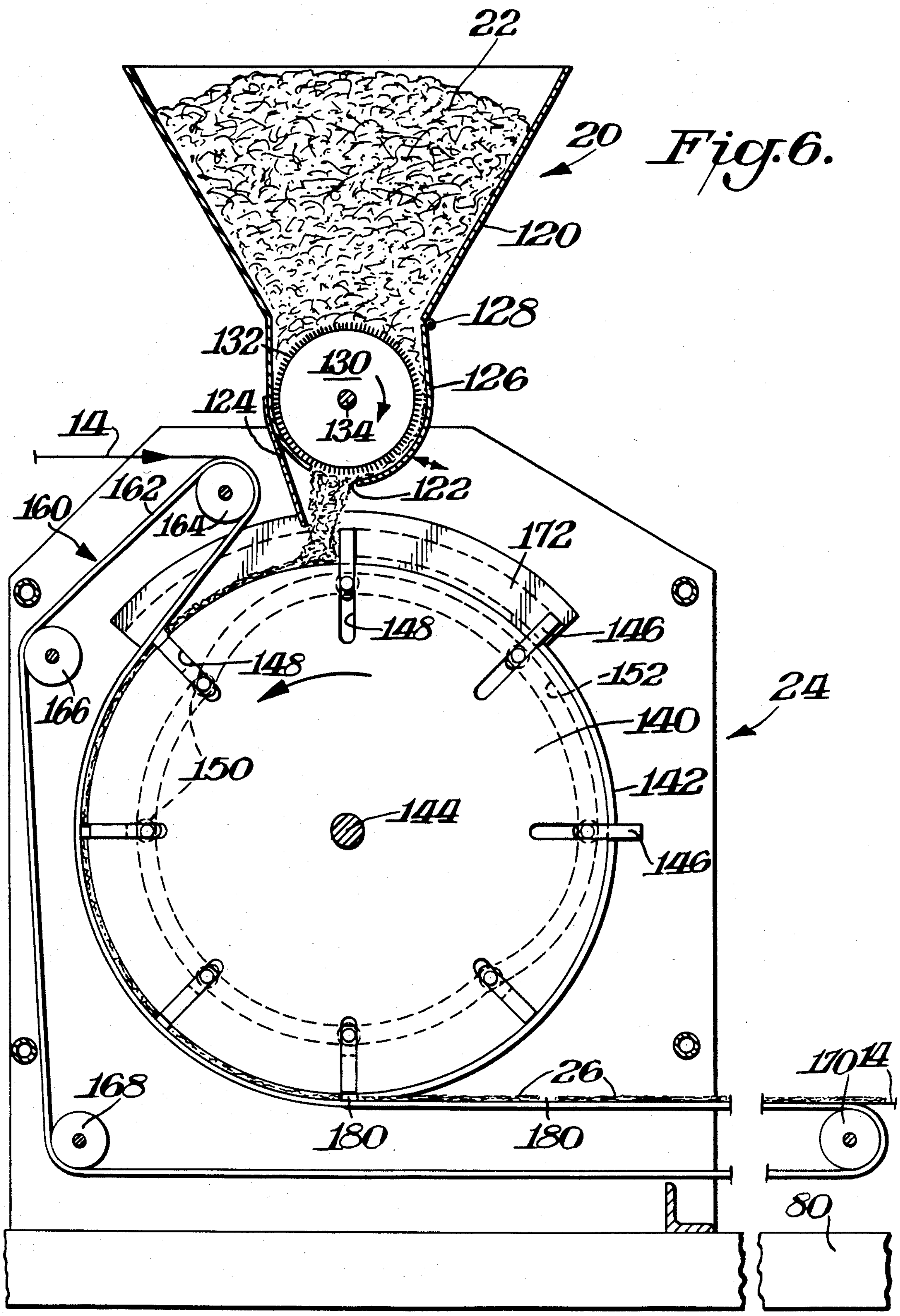
FIG. 6 is a sectional view taken along line 6—6 of FIG. 5.

As shown best in FIGS. 5 and 6, filler depositing structure 24 of apparatus 10 includes a drum 140 having a substantially cylindrical outer surface 142, the drum being journaled to framework 80 of apparatus 10 for rotation about a transverse axis 144. Drum 140 carries a plurality of equally spaced apart radially shifting spacer bars 146 at the outer surface thereof. These spacer bars 146 transversely extend across drum surface 142 and function to divide the stream of filler material discharged onto the surface into individual pocket amounts 26 of filler material 22. Once such pocket of filler material is formed by the spacing between each adjacent pair of spacer bars.

Radial shifting of spacer bars 146 is accomplished by bar operators which function to periodically retract the spacer bars to below surface 142 as the drum rotates. As shown best in FIG. 6, each spacer bar is mounted for radial shifting within a radial slot 148 in the drum. Additionally, each spacer bar includes cam followers 150 at the transverse ends of the bar, and these followers ride in cam tracks 152, one track on each side of the drum. The tracks are milled or otherwise formed in stationary cam plates 154 positioned on each side of the drum.

As explained more fully below, drum 140 is driven so that it rotates in the direction of the travel path of endless bottom sheet 14. Pressing structure 160 guides and urges the adhesive coated surface of the endless bottom sheet into engagement with the pockets 26 of filler material 22 located between spacer bars 146. Such pressing structure comprises a continuous compression belt 162 trained about a plurality of belt rolls 164,166,168,170 rotatably journaled to framework 80 of apparatus 10. As shown best in FIG. 6, the bottom sheet is urged against drum surface 142 by compression belt 162, and such frictional engagement produces the pulling action for unwinding endless bottom sheet 14 from supply roll 54.

The stream of filler material flows onto the outer surface 142 of drum 140 where it is divided into individual pocket amounts 26 by spacer bars 146. The transverse width of each pocket amount 26 is controlled by a pair of stationary spaced apart width guides 172,174 adjacent drum surface 142 and extending outwardly therefrom. Immediately below discharge opening 122 of filler metering structure 20, spacer bars 146 are extended and adjacent pairs of these bars cooperate with width guides 172,174 to form an enclosure which determines the width and length dimensions of the pocket amounts of filler material. As the drum rotates, compression belt 162 guides and urges the adhesive coated surface of the bottom sheet into engagement with the pockets of filler material located between the spacer bars. Just prior to the adhesive coated surface engaging the pockets of filler material, spacer bars 146 are retracted by the action of cam followers 150 and the stationary cam tracks 152 at each side of the drum. As a result, each spacer bar is shifted from an extended position where its outer tip portion is outwardly of drum surface 142 to its retracted position where the bar tip is below the drum surface.

As the endless bottom sheet 14 travels away from drum 140, spaced apart pocket amounts 26 of filler material 22 remain with the sheet being glued thereto. Each individual pocket amount of filler material is surrounded by adhesive coated transverse and side peripheral surface portions of the bottom sheet. Adhesive coated transverse surface portions 180 are formed by the action of the spacer bars which prevents filler material from adhering to those portions. Similarly, adhesive side surface portions 182 are left without any filler material adhering thereto by the action of width guides 172,174 which prevent filler material from traveling further to the sides as it is discharged onto the drum surface.

The top sheet feeding structure 28 is a duplicate of the bottom sheet feeding structure 12 and similar reference characters are utilized to identify similar parts. The only significant difference is that the feeding structure for top sheet 30 does not shift to realign the travel path of the top sheet. Instead, as explained more fully below, other structure is employed to correct any misalignment of the top sheet feed.

As shown best in FIGS. 1, 2 and 4, top sheet feeding structure 28 is off to the side, oriented at a right angle to the feed of bottom shaft 14. A horizontal roller 190 angled 45° to the travel direction of both sheets is appropriately mounted to framework 80 to change the direction of travel of the top sheet and position it directly above the bottom sheet. Midway between the top sheet feeding structure and angled roller 190, first and second printing stations 192,194 are secured to framework 80 to facilitate printing upon the upper surface of the top sheet in several colors. Each station includes a print roller 196 and an ink applicator 198 which transfers ink from source 200 to the printing roller. First printing station 192 may utilize ink of one color with the second station printing a different color. Each printing roller 196 cooperates with a suitable support roller 202 and together these rollers form a nip through which top sheet 30 is guided. Roller 204 upstream of the printing stations and downstream roller 206 function to direct and guide the top sheet through the printing stations where indicia is applied to the upper surface.

Upon exiting printing stations 192,194 and downstream guide roller 206, top sheet 30 with printed indicia thereon is trained over guide rollers 208,210 to the angled roller 190 where the direction of the top sheet is changed. The travel path of the top sheet from the printing stations to the angled roller 190 must be sufficiently long to allow the ink to dry since the indicia surface of top sheet 30 contacts the surface of roller 190 during the directional change. Moreover, as best shown in FIGS. 2 and 4, a walk-over device 212 is provided for the convenience of the operators attending apparatus 10. Rather than wall around the top sheet feeding structure 28, crossover 212 provided convenient and ready access to the apparatus.

Endless top sheet 30 enters the main flow of the apparatus where it is trained about a pair of spaced apart rollers 220,222 designed to alter the travel path of the top sheet in order to correct any misalignment thereof. In this regard rollers 220,222 are journaled to a frame 224 pivotally connected to main framework 80 by a central pivot point 226 positioned at the lower end of frame 224. Upper end of frame 224 is connected to main framework 80 by a pneumatic piston and cylinder device 228 and linkage 230, and frame 224 with rollers 220,222 journaled thereto swings about pivot 226 when the pneumatic device 228 is activated. Transversely swinging frame 224 to the right causes the top sheet to move right to thereby alter its travel path and vice versa.

A sensor 232 identical in construction to sensing device 110 is located between the top sheet feeding structure and the printing stations for determining the edge location of the top sheet. Depending upon interruption of the photocells of sensor 232 by top sheet 30, appropriate adjustment of the top sheet alignment is accomplished through activation of piston and cylinder device 228. When the top sheet is too far left, frame 224 and its associated rollers 220,222 are transversely shifted to the right about pivot 226 to thereby adjust the travel path to the right. Proper alignment of top sheet 30 is thereby accomplished which insures proper printing of the indicia upon the upper surface of the top sheet.

Upon exiting the alignment adjustment arrangement, top sheet 30 is guided over a roller 234 to second gluing structure 32 where liquid adhesive 18 is applied to the lower surface of the sheet. Gluing structure 32 is similar in all respects to structure 16 and similar reference characters are used to identify similar parts. Upon exiting the gluing structure, top sheet 30 is trained over three rollers 236,238,240 which guide the sheet to laminating structure 34 where both sheets are joined together.

Figure 7:
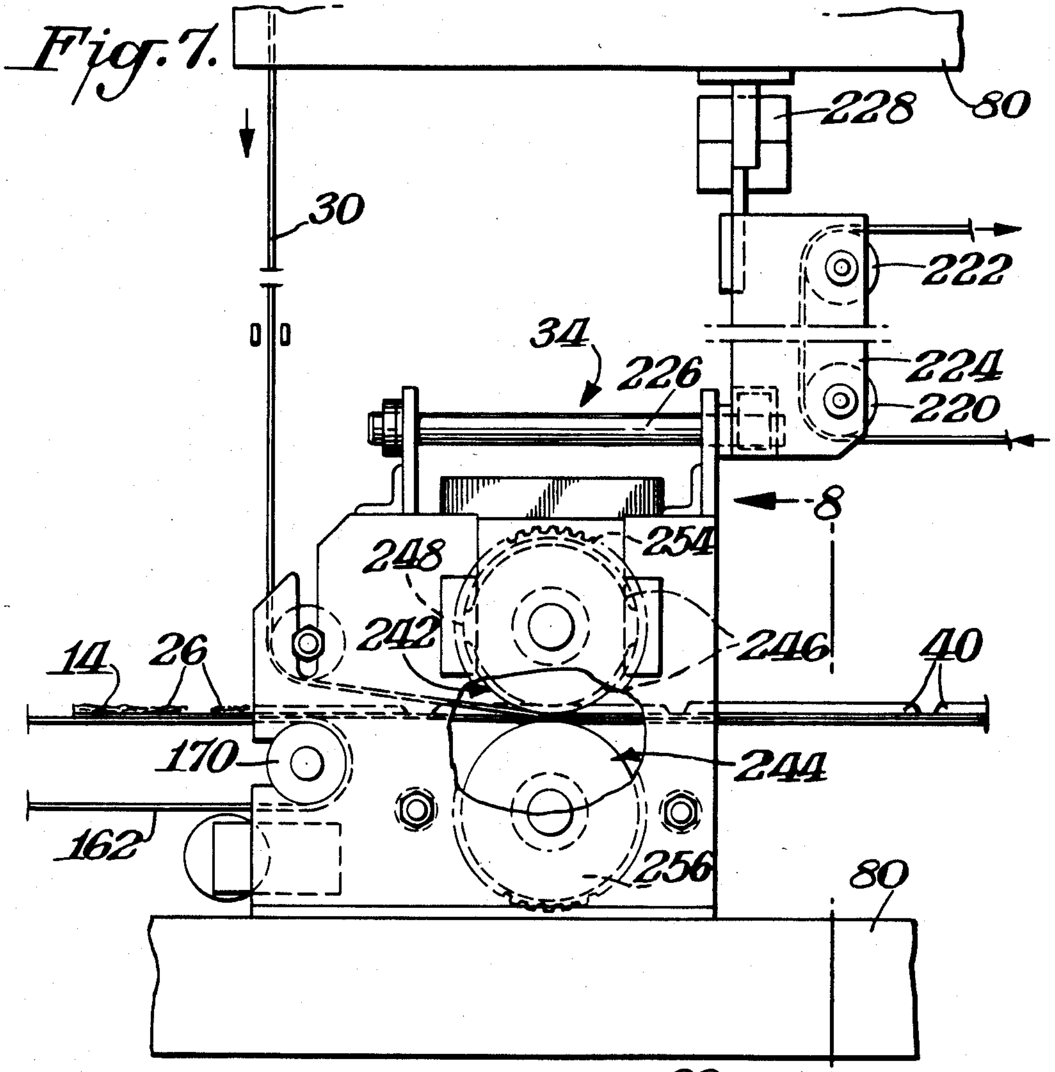
FIG. 7 is an enlarged side elevational view of the laminating station of the pad manufacturing apparatus.
Figure 8:
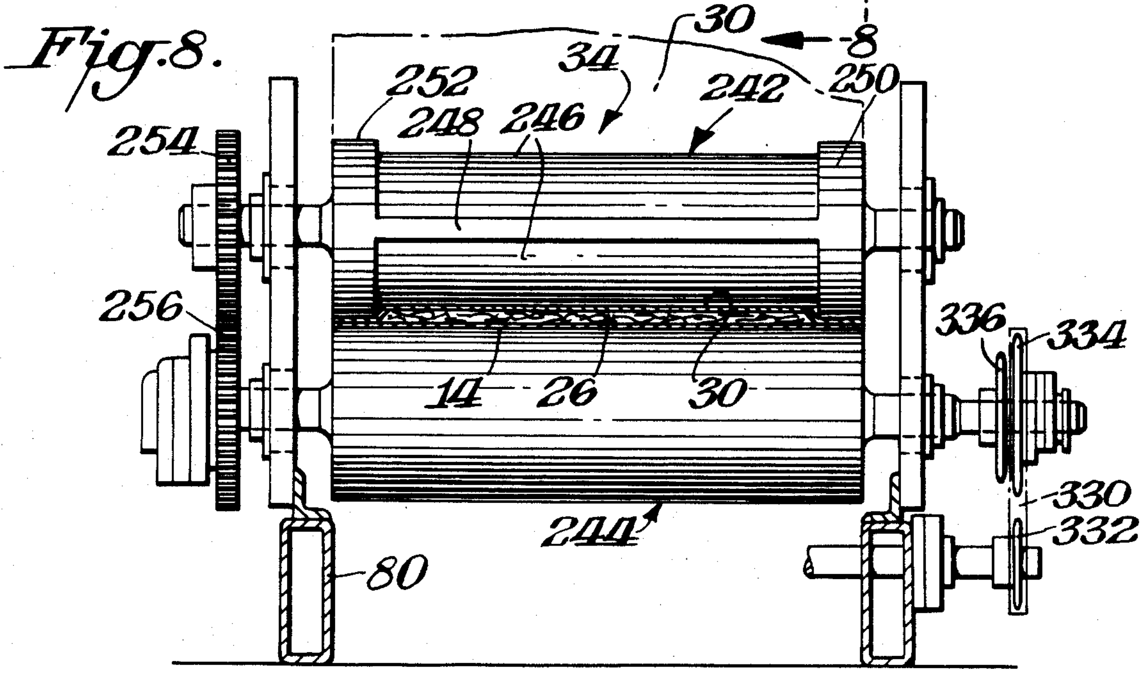
FIG. 8 is a sectional view taken along line 8—8 of FIG. 1.
Figure 9:
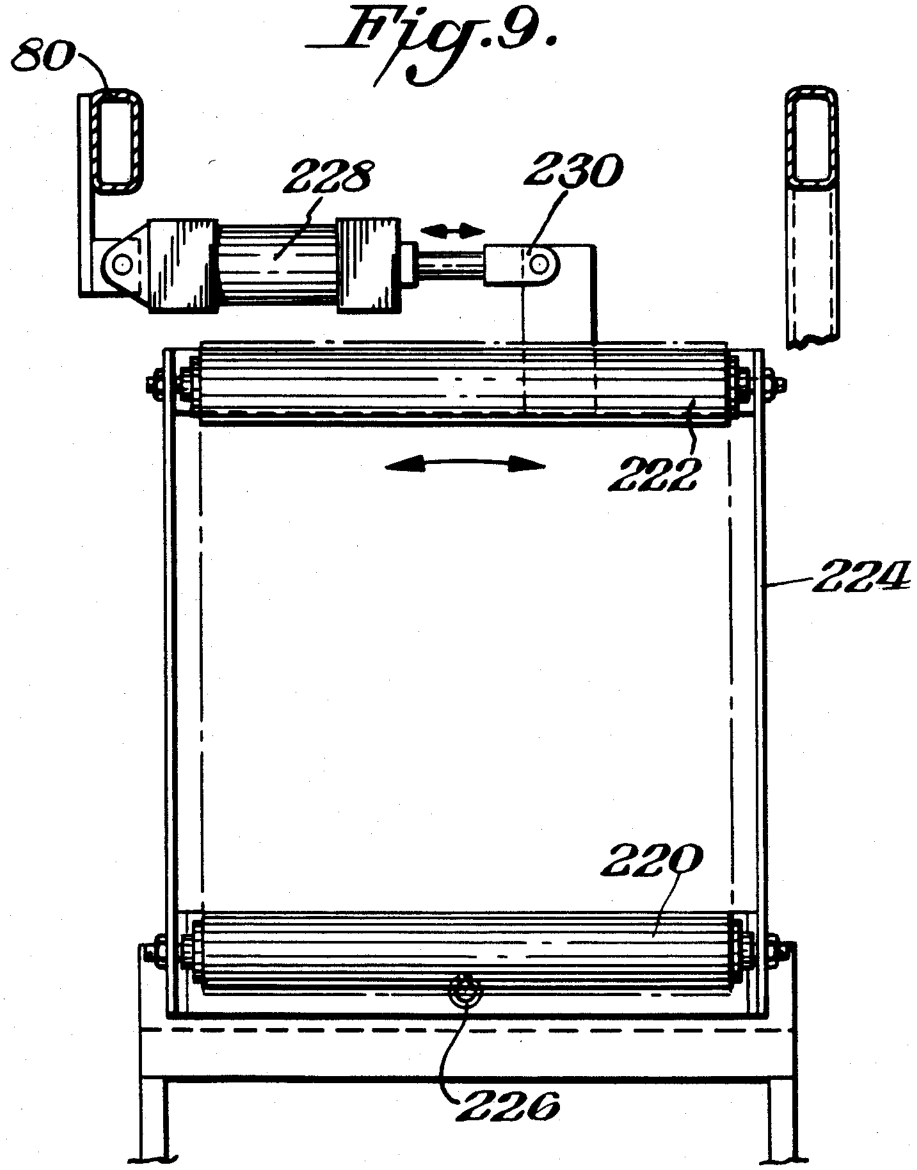
FIG. 9 is a sectional view taken along line 9—9 of FIG. 1.

As shown best in FIGS. 7 and 8, laminating structure 34 is arranged to join the adhesive coated transverse and side peripheral surface portions, 180 and 182, of bottom sheet 14 with the adhesive coated top sheet 30 to thereby form continuous laminate 36 with spaced apart pocket amounts 26 of filler material 32 between the sheets. Laminating structure 34 includes a pair of rotatable rollers 242,244 forming a roller nip through which the top and bottom sheets are directed. Roller 240 guides the top sheet into the laminating nip while the exit end of compression belt 162 serves to direct bottom sheet 14 with the filler material thereon into the laminating nip. Roller 242 of laminating structure 34 includes two spaced apart cavities 246 in the surface thereof designed to accommodate the spaced apart pocket amounts of filler material as the sheets are joined together. These cavities are separated from each other by transverse pressing bars 248 which function to press the top sheet 30 against the adhesive coated transverse surface portions 180 of the bottom sheet. Additionally, laminating roller 246 includes narrow cylindrical pressing sections 250,252, one on each side of the roller joining the transverse pressing bars 248. The narrow cylindrical pressing sections function to laminate top sheet 30 to the adhesive coated side surface portions 182 of the bottom sheet. As is clear from the drawing, roller 244 of laminating structure 34 has a cylindrical outer surface which cooperates with the transverse pressing bars and the narrow cylindrical pressing sections on roller 242 during the joining procedure. Gearing 254,256 interconnects the rollers 242,244 so that they rotate as a unit. Also, as explained below, roller 244 is positively driven and has a surface speed which is substantially equal to the travel rate of the top and bottom sheets.

Figure 11:
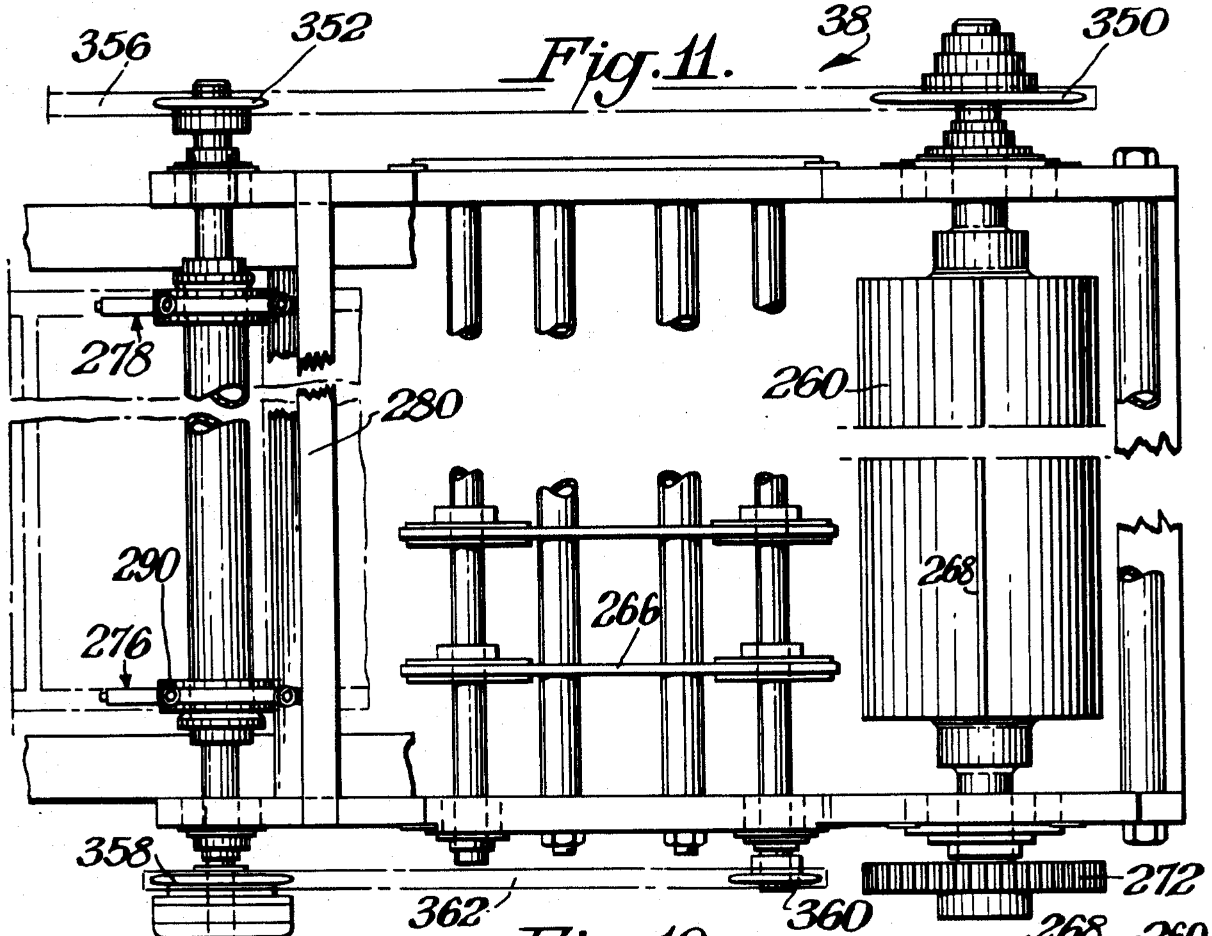
FIG. 11 is a top plan view of the cutting and trimming station shown in FIG. 10.
Figure 10:
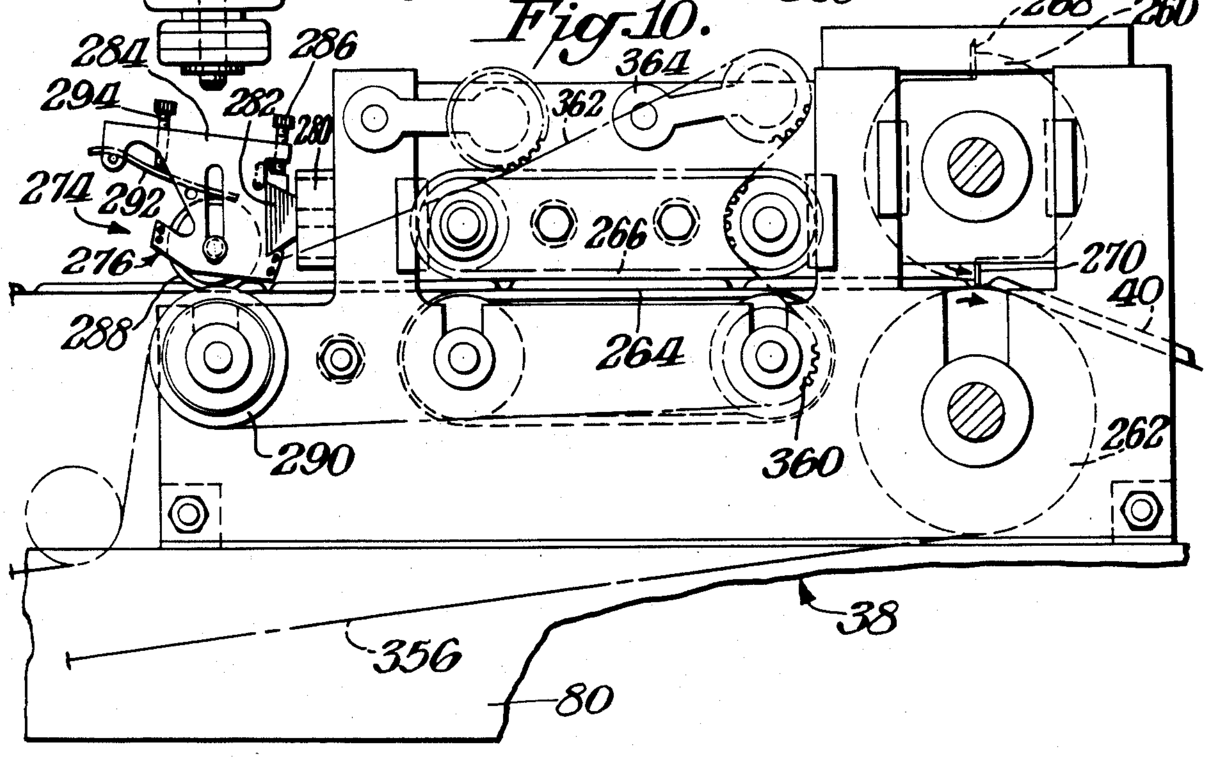
FIG. 10 is an enlarged side elevational view of the cutting and trimming station of the pad manufacturing apparatus.
Figure 12:
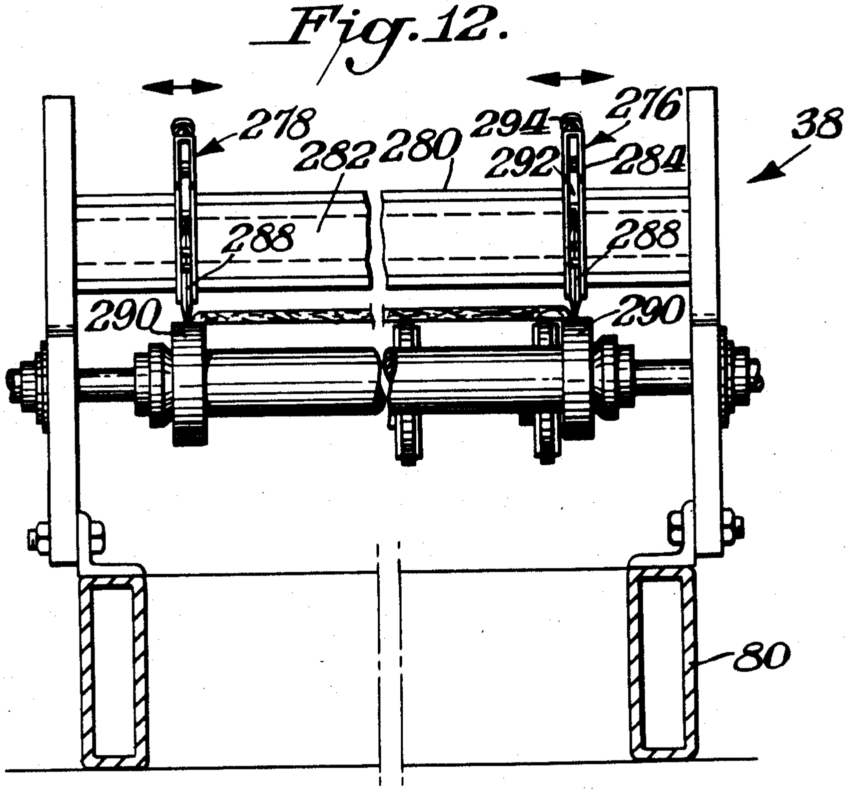
FIG. 12 is a sectional view taken along line 12—12 of FIG. 10.

FIGS. 10, 11 and 12 illustrate the details of severing structure 38 which functions to transversely cut continuous laminate 36 midway between adjacent pockets of filler material to thereby form individual packaging pads 40. Primarily, severing structure 38 includes a pair of rotatable rollers 260,262 forming a roller nip through which laminate 36 is directed. Guide structure comprising a lower belt conveyor 264 and an overhead belt conveyor 266 operates to support and deliver the continuous laminate into and through the roller nip formed by the cutting rollers. Both conveyors are driven and continuous laminate 38 is frictionally held between them. Upper cutting roller 260 includes opposed transverse knife blades 268,270 extending from the surface thereof arranged to transversely cut the continuous laminate between the pockets of filler material. These knife blades 268,270 are equally spaced apart and the circumferential distance between the blades is equal to the length dimension of the packaging pad, such length dimension being measured between adjacent transverse portions 180 from the midpoint of these portions. Hence, as cutting rollers 260,262 rotate and laminate 36 passes through the roller nip, the transverse cutting blades register with and transversely cut the laminate midway between adjacent pockets of filler material. Roller 262 has a relatively smooth exterior and functions as a reaction surface against which knife blades 268,270 are pressed during the severing process. Rollers 260,262 are geared together at 272 and rotate as a unit. As explained more fully below, these rollers are positively driven and each has a circumferential speed substantially equal to the travel rate of continuous laminate 36.

Prior to entering the nip of cutting rollers 260,262, continuous laminate 36 passes through an edge trimming arrangement 274 comprising a pair of spaced apart side edge trimmers 276,278 arranged to continuously trim the side edges of the laminate. The trimmers are adjustably mounted to stationary transverse support bar 280 having a dovetail element 282, and each trimmer includes a frame 284 connected to the dovetail element. Both trimmers are transversely positioned along the element by sliding the trimmer frames to the desired side locations. Each frame is then positively anchored to dovetail element 282 by tightening locking screw 286 on the frame which bears against the element.

Each side edge trimmer includes a rotatable knife blade 288 journaled to frame 284 and bearing against a reaction roller 290. Both reaction rollers are positively driven at a circumferential speed substantially equal to the travel rate of continuous laminate 36, and knife blades 288 rotate with the reaction rollers through frictional engagement therewith. As shown best in FIG. 12, after each trimmer 276,278 is transversely adjusted along dovetail support element 282, the laminate travels between the knife blades and the reaction rollers to continuously side trim the edges thereof. The cutting pressure exerted by the knife blade against the reaction roller may be adjusted by changing the tension of a leaf spring 292 which bears against the structure of the knife blade. Tension on the leaf spring is adjusted by a set screw 294 threaded to frame 284 and bearing against the spring.

As shown best in FIG. 1, the drive mechanism for apparatus 10 includes main drive 300 connected to differential gear box 302 by chain 304 and sprockets 306,308. First drive shaft 310 interconnects differential gear box 302 with upstream gear box 312 for driving first gluing structure 16 via chain 314 and sprockets 316,318. Chain 320 interconnects sprocket 322 on gear box 312 with sprocket 324 on drum shaft 144 for rotating the applicator drum.

Differential gear box 302 is also connected to downstream gear box 326 by drive shaft 328. Chain 330 and sprockets 332,334 connect gear box 326 to laminating roller 244. Additionally, roller 244 carries sprocket 336 connected to drive second gluing structure 32 via chain 338 and sprocket 340 on the gluing structure.

Finally, downstream gear box 326 is connected to drive another downstream gear box 342 via drive shafts 344,346 and intermediate downstream gear box 348. Sprocket 350 on cutting roller and sprocket 352 on reaction roller 290 are connected to sprocket 354 on gear box 342 by chain 356. Such interconnection drives the side edge trimmers and the transverse cutters. Another sprocket 358 on reaction roller 290 is connected to sprocket 360 on lower belt conveyor 264 by chain 362 for moving the conveyor. Overhead conveyor 266 is also driven by interconnecting the movement of both conveyors with a chain and sprocket arrangement 364.

The sprocket diameters and rotational directions are selected to achieve unified drive of all machine components and to insure that the surface speeds of the drum and all driven rollers are substantially equal and in appropriate direction.

Figure 15:
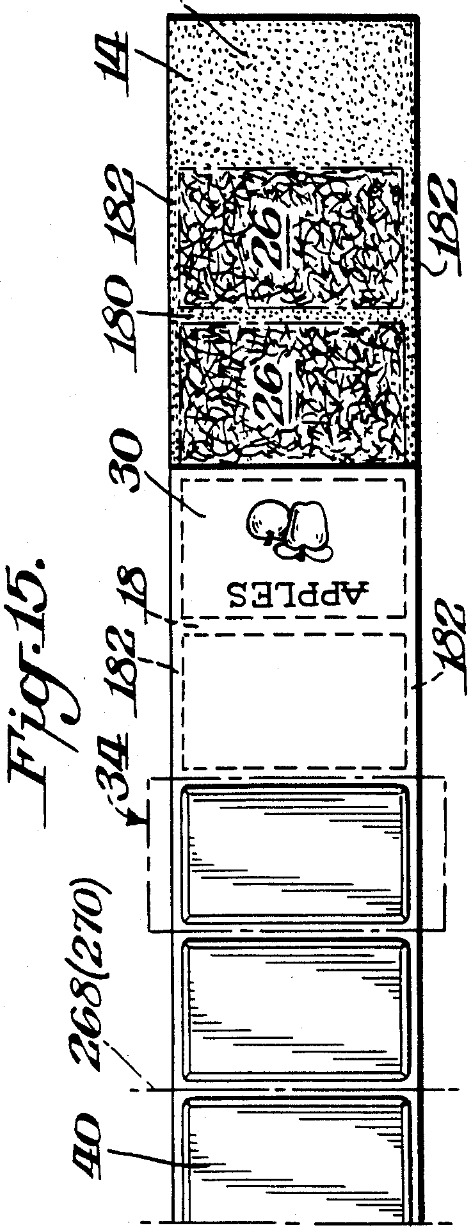
FIG. 15 is a schematic view that diagrams the various processing steps in the formation of packaging pads, according to the present invention.

FIG. 15 schematically diagrams the various processing steps utilized in the formation of packaging pads 40. Initially the upper surface of endless bottom sheet 14 is coated with liquid adhesive 18 and equally spaced apart pocket amounts 26 of filler material are applied to central surface portions of the coated bottom sheet. This procedure leaves transverse surface portions 180 and side surface portions 182 of the bottom sheet without any filler material adhering thereto. Next, top sheet 30 with adhesive on the lower surface and indicia on the upper surface is positioned over the bottom sheet and the equally spaced apart pocket amounts of filler material. Laminating structure 34 joins the transverse and side surface portions of the bottom sheet to the adhesive coated surface of the top sheet to thereby form continuous laminate 36. Transverse knife blades 268,270 cut the continuous laminate midway between adjacent pockets of filler material to thereby form individual packaging pads 40 while appropriately positioned edge trimmers 276,278 cut the side selvage from the laminate.

What is claimed:

1. Apparatus for manufacturing packaging pads having bottom and top sheets laminated together along transverse and side peripheral surface portions and a pocket of filler material disposed between central surface portions of the sheets, the apparatus comprising bottom sheet feeding means constructed and arranged to continuously feed an endless bottom sheet along a predetermined travel path, first gluing means constructed and arranged to continuously apply liquid adhesive to the entire upper surface of the bottom sheet, filler metering means constructed and arranged to supply a continuous stream of filler material at a predetermined rate, filler depositing means constructed and arranged to continuously receive and separate the continuous stream of filler material into individual pocket amounts and to serially apply such amounts to spaced apart central surface portions on the adhesive coated surface of the bottom sheet whereby each individual pocket amount of filler material is surrounded by adhesive coated transverse and side peripheral surface portions of the bottom sheet, top sheet feeding means constructed and arranged to continuously feed an endless top sheet, second gluing means constructed and arranged to continuously apply liquid adhesive to the entire lower surface of the top sheet, laminating means constructed and arranged to join the adhesive coated transverse and side peripheral surface portions of the bottom sheet with the adhesive coated top sheet to thereby form a continuous laminate with spaced apart pocket amounts of filler material therebetween, and severing means constructed and arranged to transversely cut the continuous laminate midway between adjacent pockets of filler material to thereby form individual packaging pads, and wherein the filler depositing means includes a drum having a substantially cylindrical outer surface and rotatably mounted about a transverse axis, discharge means on the filler metering means directing the continuous stream of filler material onto the outer surface of the drum, equally spaced apart radially shifting spacer bars at the outer surface of the drum transversely extending across the drum surface for dividing the filler material into individual pocket amounts, pressing means guiding and urging the adhesive coated surface of the bottom sheet into engagement with the pockets of filler material located between the spacer bars, and bar operator means connected to retract the spacer bars to below the drum surface as the adhesive coated surface of the bottom sheet is urged into engagement with the individual pockets of filler material on the drum surface.

2. Apparatus as in claim 1 wherein the bar operator means includes a stationary cam plate at each side of the rotatable drum with a continuous cam track in each plate, cam followers on the spacer bars connected to ride in the cam tracks for radially shifting the spacer bars between extended positions where the outer tip portions thereof are outwardly of the drum surface and retracted positions where the bar tip portions are below the drum surface.

3. Apparatus as in claim 1 wherein the filler depositing means further includes stationary spaced apart width guides adjacent the surface of the drum and extending outwardly therefrom arranged to control the transverse width of filler material directed onto the outer surface of the drum.

4. Apparatus as in claim 1 wherein the discharge means on the filler metering means is adjustable for controlling the rate amount of the continuous stream of filler material.

5. Apparatus as in claim 1 wherein the pressing means guiding and urging the adhesive coated surface of the bottom sheet into engagement with the pocket amounts of filler material on the outer surface of the drum comprises a continuous compression belt trained about a plurality of belt rollers.

6. Apparatus for receiving filler material and depositing same onto a continuous moving web comprising a drum having a substantially cylindrical outer surface and rotatably mounted about a transverse axis, means directing a continuous stream of filler material onto the outer surface of the drum, equally spaced apart radially shifting spacer bars at the outer surface of the drum transversely extending across the drum surface for dividing filler material into individual pocket amounts, pressing means guiding and urging the continuously moving web into engagement with the pockets of filler material located between the spacer bars, and bar operator means connected to retract the spacer bars to below the drum surface as the web is urged into engagement with the individual pockets of filler material on the drum surface.

7. Apparatus as in claim 6 wherein the bar operator means includes a stationary cam plate at each side of the rotatable drum with a continuous cam track in each plate, cam followers on the spacer bars connected to ride in the cam tracks for radially shifting the spacer bars between extended positions where the outer tip portions thereof are outwardly of the drum surface and retracted positions where the bar tip portions are below the drum surface.

8. Apparatus as in claim 6 wherein the means directing a continuous stream of filler material onto the outer surface of the drum includes stationary spaced apart width guides adjacent the surface of the drum and extending outwardly therefrom arranged to control the transverse width of filler material directed onto the drum.

9. Apparatus as in claim 8 wherein the stationary spaced apart width guides are adjustable toward and away from one another to vary the transverse width of filler material directed onto the drum.

10. Apparatus as in claim 6 wherein the pressing means guiding and urging the continuously moving web into engagement with the individual pockets of filler material on the outer surface of the drum comprises a continuous compression belt trained about a plurality of belt rollers.

* * * * *